No. 714,298. Patented Nov. 25, 1902.
T. GRANT.
PLUNGER VALVE AND PACKING.
(Application filed Nov. 21, 1901.)
(No Model.) 2 Sheets—Sheet 1.
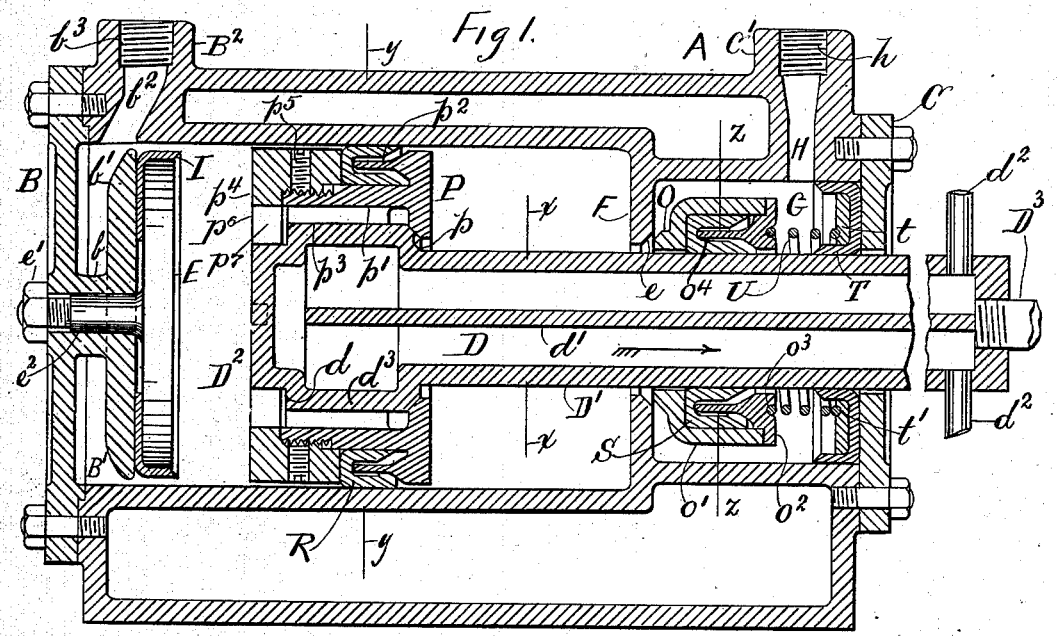
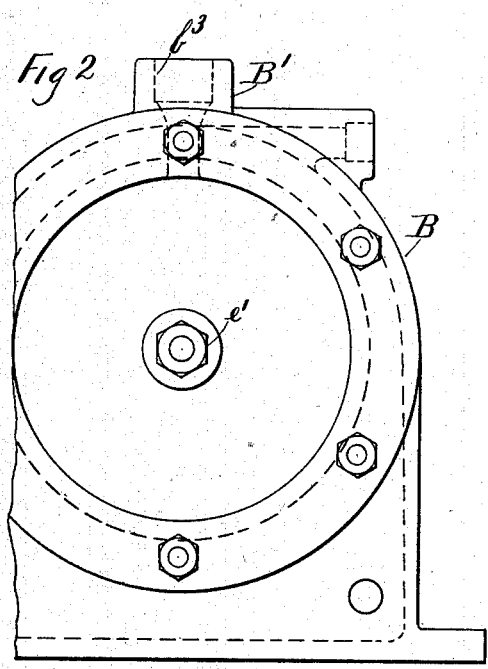
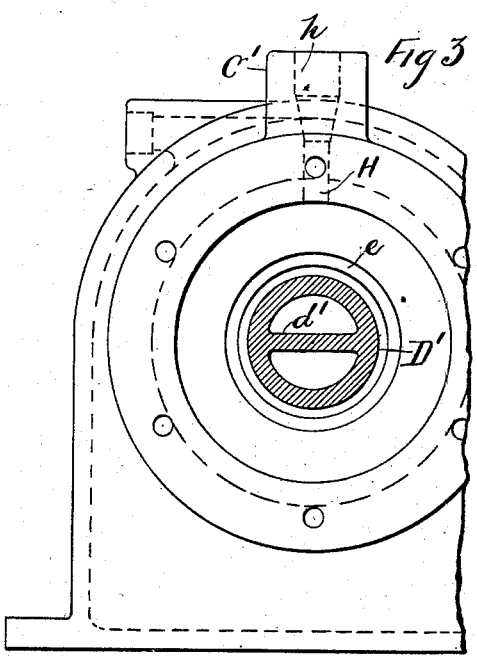
Witnesses
William P. Francl
Jas. A. Thomson
Inventor
Thomas Grant
By his Attorney
A. A. de Bonneville

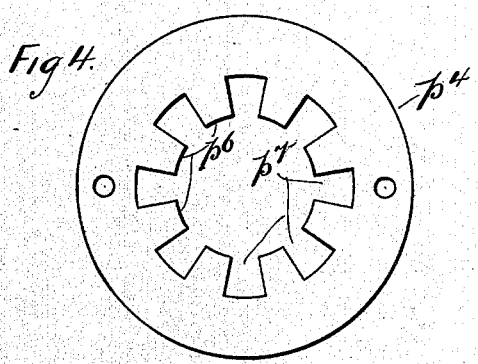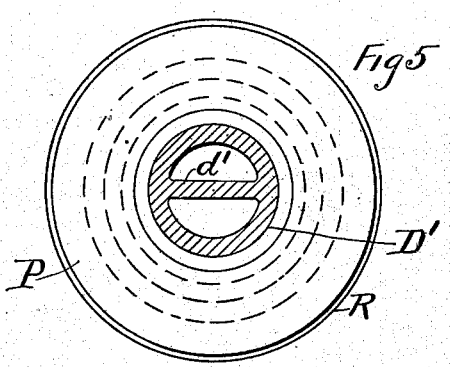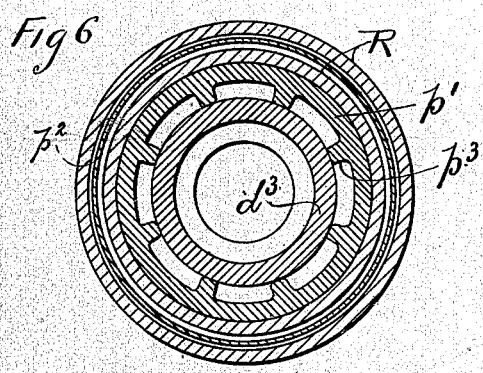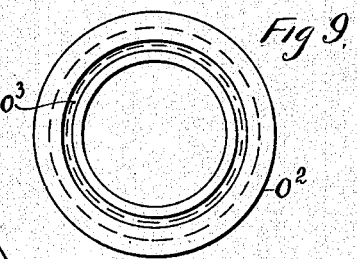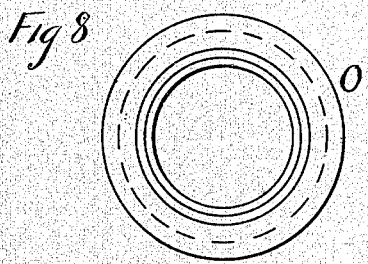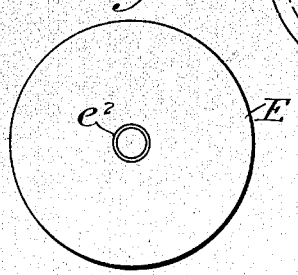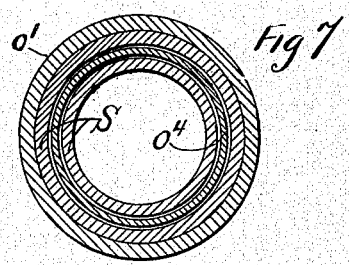

UNITED STATES PATENT OFFICE.

THOMAS GRANT, OF TOTTENVILLE, NEW YORK, ASSIGNOR OF ONE-HALF TO HARTWIG A. COHEN, OF SALT LAKE CITY, UTAH.

PLUNGER VALVE AND PACKING.

SPECIFICATION forming part of Letters Patent No. 714,298, dated November 25, 1902.

Application filed November 21, 1901. Serial No. 83,133. (No model.)

*To all whom it may concern:*

Be it known that I, THOMAS GRANT, a citizen of the United States, and a resident of Tottenville, borough of Richmond, in the county of Richmond and State of New York, have invented certain new and useful Improvements in Plunger Valves and Packings, of which the following is a specification.

My invention relates to plunger-valves and self-closing cylinder-packing.

The object of the invention is the production of a plunger with valves moving thereon and packings carried on the valves which will effectually pack the said plunger with its accompanying cylinder.

In the drawings my invention is shown applied to a compressor, and it is evident that the invention may be applied to many different types of cylinders with reciprocating plungers or pistons.

Figure 1 represents a vertical axial longitudinal section of a compressor and my improved valves and packings. Fig. 2 shows the back end of the compressor. Fig. 3 is a front end of the compressor with the head removed and a section through the plunger on line $xx$ of Fig. 1. Fig. 4 represents an elevation of the follower-plate of the plunger-head valve. Fig. 5 shows a section and end view of the plunger on the line $xx$ of Fig. 1. Fig. 6 shows a section of the plunger-head on the line $yy$ of Fig. 1. Fig. 7 represents a section through the plunger and plunger-valve on the line $zz$ of Fig. 1. Figs. 8 and 9 show end views of the plunger-valve or outlet-valve. Fig. 10 shows an end view of the retaining-plate on a reduced scale.

A compressor is shown consisting of the water-jacketed cylinder A, back cylinder-head B, front cylinder-head C, a reciprocating plunger D, an inlet-valve I, plunger-head valve P, and outlet-valve O. The back cylinder-head B is bolted to the barrel of the cylinder in the ordinary way, and from its inner face there extends a boss $b$, which carries a circular disk $b'$, and the space between the said disk and the cylinder-head constitutes a reservoir B', to which leads the inlet-port $b^2$ from the opening $b^3$ in the boss B$^2$.

A circular retaining-plate E, with its central projecting spindle $e^2$, secures the cup-shaped disk valve I against the circular disk $b'$ by virtue of the pressure obtained against the said valve when tightening the nut $e'$ against the back cylinder-head B.

The barrel of the cylinder contains the internal flange F, which forms a valve-chamber G with the front cylinder-head C for the outlet-valve O. An outlet-port H leads from the said valve-chamber to the outlet-opening $h$ in the boss C'.

The plunger D comprises the plunger-barrel D' and plunger-head D$^2$ with rod D$^3$. The plunger-head D$^2$ comprises the cylindrical portion $d^3$, which is of larger diameter than the plunger-barrel D' and contains a valve-seat $p$ and a shoulder $d$. The valve P, which moves on the plunger-head D$^2$, consists of the inner cylindrical portion $p'$, to which is connected the outer cylindrical portion $p^2$. Wings $p^3$ extend from $p'$, and the outer surface of $p'$ is threaded to receive the follower-plate $p^4$, which is held in place by set-screws $p^5$.

A plunger-head packing R is secured between the cylindrical portion $p^2$ and follower-plate $p^4$. The latter contains projecting lugs $p^6$, by virtue of which are formed ports $p^7$, which are opposite the ports formed by the wings $p^3$.

The outlet-valve O comprises the cup-shaped portion $o'$, which is formed to suit the seat $e$ on the flange F. The valve carries the cup-shaped packing S, which is held in place by the cylindrical cap $o^2$.

A plunger-packing T is secured by the cylinder-head C and the ring $t$. A spring U bears between the rings $o^2$ and $t$, fitting in circular grooves $o^3$ and $t'$.

The plunger is provided with the division-plate $d'$ and water-supply pipes $d^2$.

To operate the compressor, the plunger is reciprocated by any suitable source of power through the rod D$^3$, and when it is moving in the direction shown by the arrow the inlet-valve I is opened by the suction of the plunger, the valve P is closed by the pressure on the front side of the same, and the outlet-valve is kept open by the said pressure. A quantity of air, vapor, or other fluid is then drawn into the barrel of the cylinder between the cylinder-head B and the plunger-head D$^2$, and the air, vapor, and the like on the other side of the said head is both compressed and forced through the outlet-valve O and opening h. On the return stroke of the plunger the pressure in the cylinder closes the inlet-valve I, opens the valve P, and closes the outlet-valve O. While the plunger is moving in the latter direction, the air, vapor, or other fluid is transferred from the inlet to the outlet end of the cylinder and is at the same time compressed by virtue of the space displaced by the entering of the plunger D into the cylinder. When the plunger again moves in the direction shown by the arrow, the air, vapor, and the like between the plunger-head and the valve O is again compressed, and when it reaches a higher pressure than the air or vapor contained beyond the outlet-valve O the said valve opens to allow the escape of the compressed air or gas. This novel combination produces a compound compressor with only one cylinder and in which the pressure of the air, vapors, or fluids maintains the packings tight, and it is evident that a non-compound compressor could be designed in which my invention could be employed in various ways.

Having described my invention, I claim—

1. The combination of a cylinder, a plunger moving therein, a plunger-head, and a valve-seat formed on one end and a shoulder on the other end of the said head, a valve moving on the plunger-head, wings extending from an inner cylindrical portion of the valve and fitting the said head, an outer circular portion extending from and around the said inner cylindrical portion of the valve, a follower-plate secured to the valve, notches in the follower-plate located opposite the spaces between the wings on the valve, cup-shaped packing extending between the bore of the cylinder and the outside face of the inner cylindrical portion of the valve and surrounding the said outer circular portion.

2. The combination of a cylinder, an annular flange extending from the inner surface of the cylinder, a valve-seat formed on the said flange, a front cylinder-head on the cylinder, a valve-chest between the said annular flange and the cylinder-head, a plunger moving through the annular flange and cylinder-head, a valve in the valve-chest encircling the said plunger, a cup-shaped packing carried in the valve, a cap supported on the valve and extending into the said packing, a cup-shaped plunger-packing encircling the plunger and bearing against the cylinder-head and surface of the valve-chest, and means to bring pressure between the said valve-packing and the said plunger-packing.

3. The combination of a cylinder, a plunger with plunger-head moving in the cylinder, a valve encircling the said head and moving therewith, a cup-shaped packing carried on the said valve, and fitting between the valve and bore of the cylinder, a valve-chest formed in the cylinder, a valve in the said valve-chest surrounding the plunger, a valve-seat formed in the valve-chest, a packing at the front end of the said chest bearing against the plunger, front cylinder-head, and outer wall of the valve-chest, and means to maintain the said packing, and the packing in the valve in the said chest in proper operative position.

Signed at New York, in the county of New York and State of New York, this 19th day of November, A. D. 1901.

THOMAS GRANT.

Witnesses:
C. B. HARRIS,
WILLIAM P. FRANCL.